United States Patent
Osborne

(10) Patent No.: US 6,772,579 B2
(45) Date of Patent: Aug. 10, 2004

(54) LAWNMOWER HOUSING REINFORCEMENT

(75) Inventor: Christopher M. Osborne, Hillsborough, NC (US)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 93 days.

(21) Appl. No.: 10/086,885

(22) Filed: Mar. 4, 2002

(65) Prior Publication Data
US 2003/0163981 A1 Sep. 4, 2003

(51) Int. Cl.[7] .................................................. A01D 67/00
(52) U.S. Cl. .................................. 56/320.1; 56/15.5
(58) Field of Search .......................... 56/320.1, 320.2, 56/17.5

(56) References Cited

U.S. PATENT DOCUMENTS

| | | | |
|---|---|---|---|
| 2,265,545 A | | 12/1941 | Phelps |
| 3,005,302 A | | 10/1961 | Lucia et al. |
| 3,292,351 A | * | 12/1966 | Larson et al. ................. 56/17.2 |
| 3,320,731 A | | 5/1967 | Cody et al. |
| 4,280,319 A | | 7/1981 | Scanland |
| 4,307,563 A | | 12/1981 | Fuelling, Jr. et al. |
| 4,422,283 A | * | 12/1983 | Scanland ..................... 56/320.2 |
| 4,711,077 A | | 12/1987 | Kutsukake et al. |
| 4,887,420 A | | 12/1989 | Cerny, Jr. et al. |
| 4,899,526 A | | 2/1990 | Harris |
| 4,930,298 A | * | 6/1990 | Zenner ....................... 56/17.4 |
| 5,101,617 A | * | 4/1992 | Hare et al. ................... 56/17.4 |
| 5,157,908 A | * | 10/1992 | Sebben et al. ............. 56/320.1 |
| 5,461,847 A | | 10/1995 | Strong et al. |
| 5,638,667 A | | 6/1997 | Ellson et al. |
| 5,638,668 A | | 6/1997 | Kallevig et al. |
| 5,884,466 A | | 3/1999 | Willmering et al. |
| 6,000,202 A | | 12/1999 | Laskowski |
| 6,012,274 A | | 1/2000 | Eavenson et al. |
| 6,189,307 B1 | | 2/2001 | Buss et al. |

FOREIGN PATENT DOCUMENTS

| | | |
|---|---|---|
| EP | 0 974 256 A2 | 1/2000 |
| FR | 2 552 202 | 3/1985 |
| FR | 2552202 | * 12/1985 |
| FR | 2 603 157 | 3/1988 |

* cited by examiner

Primary Examiner—Thomas B. Will
Assistant Examiner—Meredith Petravick
(74) Attorney, Agent, or Firm—Morgan, Lewis & Bockius LLP

(57) ABSTRACT

A lawnmower deck includes a deck sub-assembly and a stiffener. The deck sub-assembly has a top surface, a skirt extending outwardly and downwardly from the top surface and encircling the top surface and a first stiffness. The skirt defines a cutting chamber underneath the top surface and a plurality of wheel mounts. The stiffener is connected to at least one of the top surface and the skirt. The stiffener and the deck sub-assembly together have a combined stiffness that is at least approximately 20% greater than the first stiffness.

27 Claims, 7 Drawing Sheets

# LAWNMOWER HOUSING REINFORCEMENT

BACKGROUND OF THE INVENTION

Lawnmowers can be configured as garden tractors, riding mowers commercial walk-behind mowers and smaller walk-behind mowers. Smaller walk-behind mowers include a prime mover mounted to the deck. Mower decks associated with garden tractors, riding mowers and commercial walk-behind mowers are removably attached to the frame of these self-propelled machines in manner that allows the deck to float along the contour of the terrain above an adjustable minimum height. These floating decks rely on a power take-off connected to the prime mover used to propel these self-propelled machines and, therefore, do not include a prime mover. More than one blade can be mounted in the cutting chamber of the deck for any of these embodiments of a lawnmower.

SUMMARY OF THE INVENTION

The present invention provides a lawnmower deck includes a deck sub-assembly and a stiffener. The deck sub-assembly has a top surface, a skirt extending outwardly and downwardly from the top surface and encircling the top surface, and a first stiffness. The skirt defines a cutting chamber underneath the top surface and a plurality of wheel mounts. The stiffener is connected to at least one of the top surface and the skirt. The stiffener and the deck sub-assembly together have a combined stiffness that is at least approximately 20% greater than the first stiffness.

The present invention also provides a lawnmower deck including a plastic deck component and a means for resisting flexion of the plastic deck component. The plastic deck has an engine bed and a skirt centered on the engine bed and extending outwardly and downwardly to encircle the engine bed. The skirt defines a cutting chamber below the engine bed and a plurality of wheel mounts.

The present invention yet also provides a walk-behind lawnmower including a deck, a stiffener, a cover, a prime mover and a handle. The deck has an engine bed and a skirt centered on the engine bed and extending outwardly and downwardly and encircling the engine bed. The skirt defines a cutting chamber below the engine bed, a discharge chute in communication with the cutting chamber, two laterally spaced front wheel mounts at the front of the deck, two laterally spaced rear wheel mounts at the rear of the deck and a channel extending between each of the wheel mounts and along the discharge chute. The stiffener is received in the channel.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENT

Figure 1:
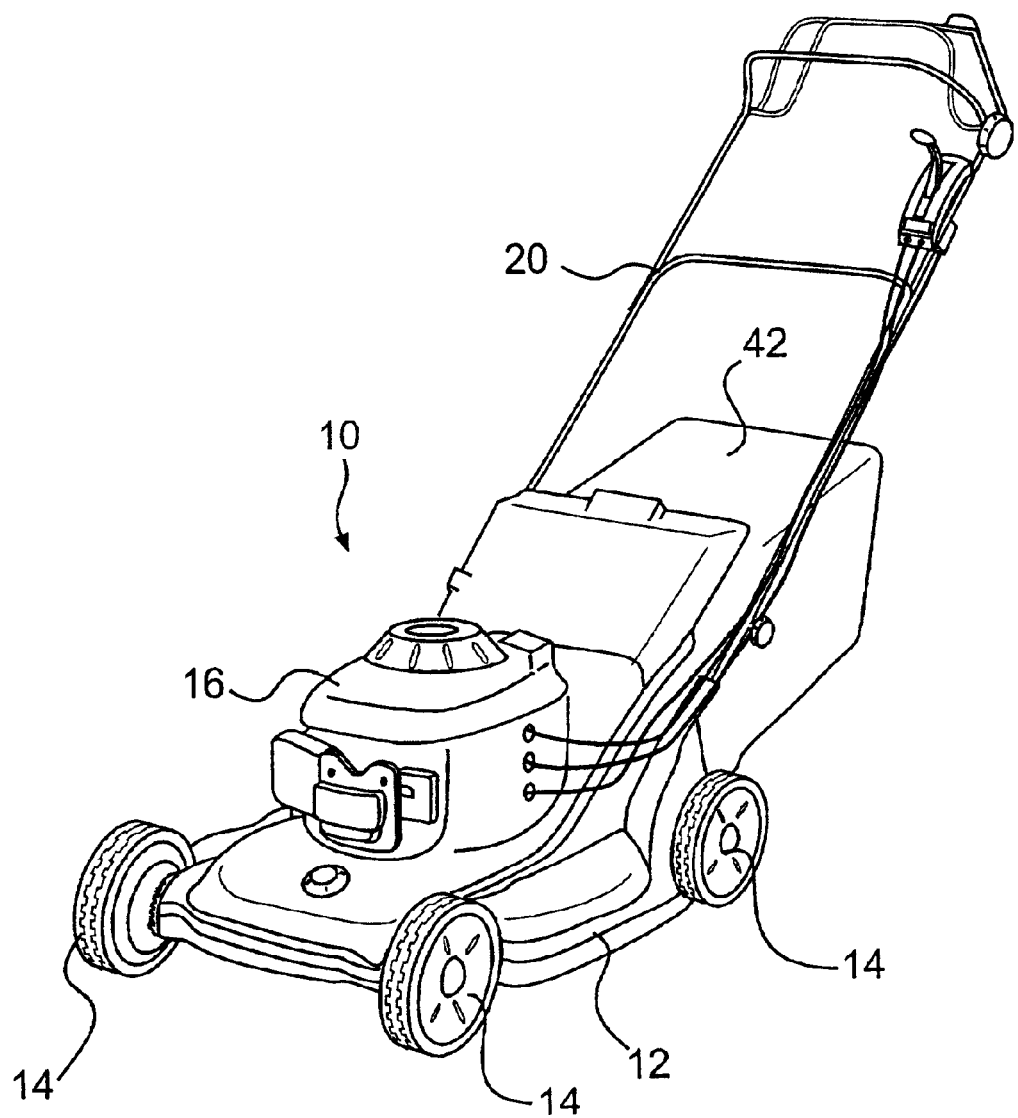
FIG. 1 is a perspective view of a lawnmower according to the present invention.

Referring to FIG. 1, a lawnmower 10 includes a deck 12, wheels 14, a prime mover 16 (e.g., an internal combustion engine or an electric motor) mounted to the deck 12, a rotary blade 18 (see FIG. 6) connected to the prime mover 16 below the deck 12 and a handle 20 connected to and extending upwardly from the deck 12.

The deck 12 supports most of the components of the lawnmower. During operation of the lawnmower, the deck 12 is subject to input forces from the operator via the handle 20, input forces from the terrain via the wheels 14 and impact forces from debris set in motion by the blade 18. Accordingly, the material strength and durability in combination with the structural design of the deck 12 permit the deck to adequately endure these static and dynamic forces.

Figure 2:
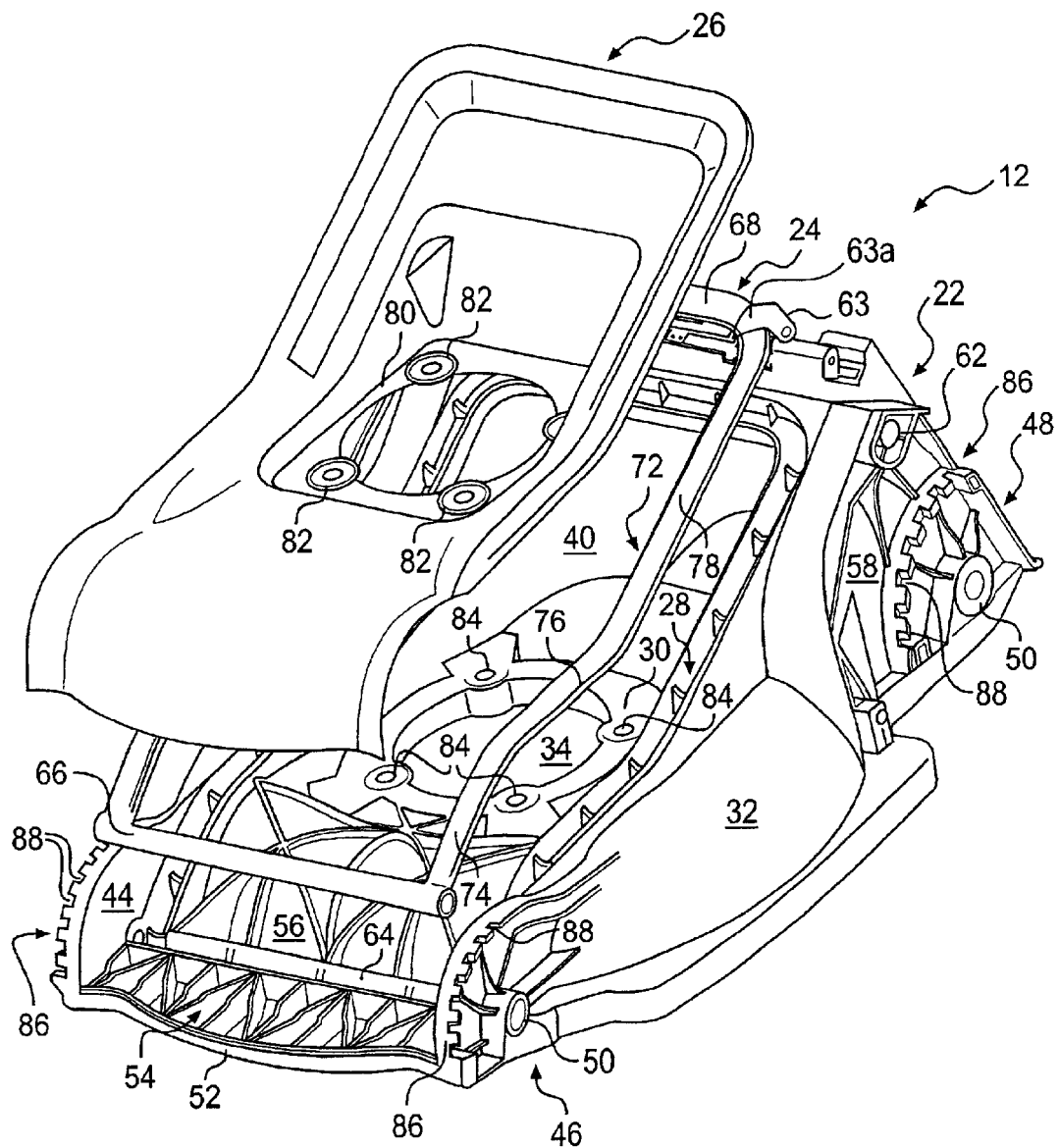
FIG. 2 is an exploded perspective view of a first embodiment of a lawnmower deck according to the present invention.

FIG. 2 illustrates the basic components of a preferred embodiment of the deck 12. In this embodiment, the deck 12 includes a main deck component 22, a stiffener 24 and a cover 26. The main deck component 22 has a torsional stiffness and a bending stiffness. The main deck component 22 can be formed as a one-piece assembly from a lightweight material such as aluminum or plastic.

A channel 28 can be formed in the main deck component 22 to receive the stiffener 24. The stiffener 24 spans a substantial portion of the length and width of the main deck component 22 and bolsters the bending stiffness and torsional stiffness of the main deck component 22. The main deck component 22 and the stiffener 24 have a combined torsional stiffness of approximately 20–50% greater than that of the main deck component 22. As will be explained in more detail below, the main deck component and the stiffener 24 have a combined bending stiffness of approximately 20% greater than that of the main deck component 22.

The stiffener can be formed as a one-piece assembly from a rigid material such as SAE 1008-1025 steel. Table A illustrates the increase in combined stiffness for various sizes of steel tubes used to form the stiffener 24.

TABLE A

| Tube Thickness (gauge) | Outside Diameter (in.) | Increase In Combined Stiffness (%) |
|---|---|---|
| 18 | 7/8 | 20 |
| 16 | 7/8 | 22 |
| 16 | 1 | 30 |

Figure 4:
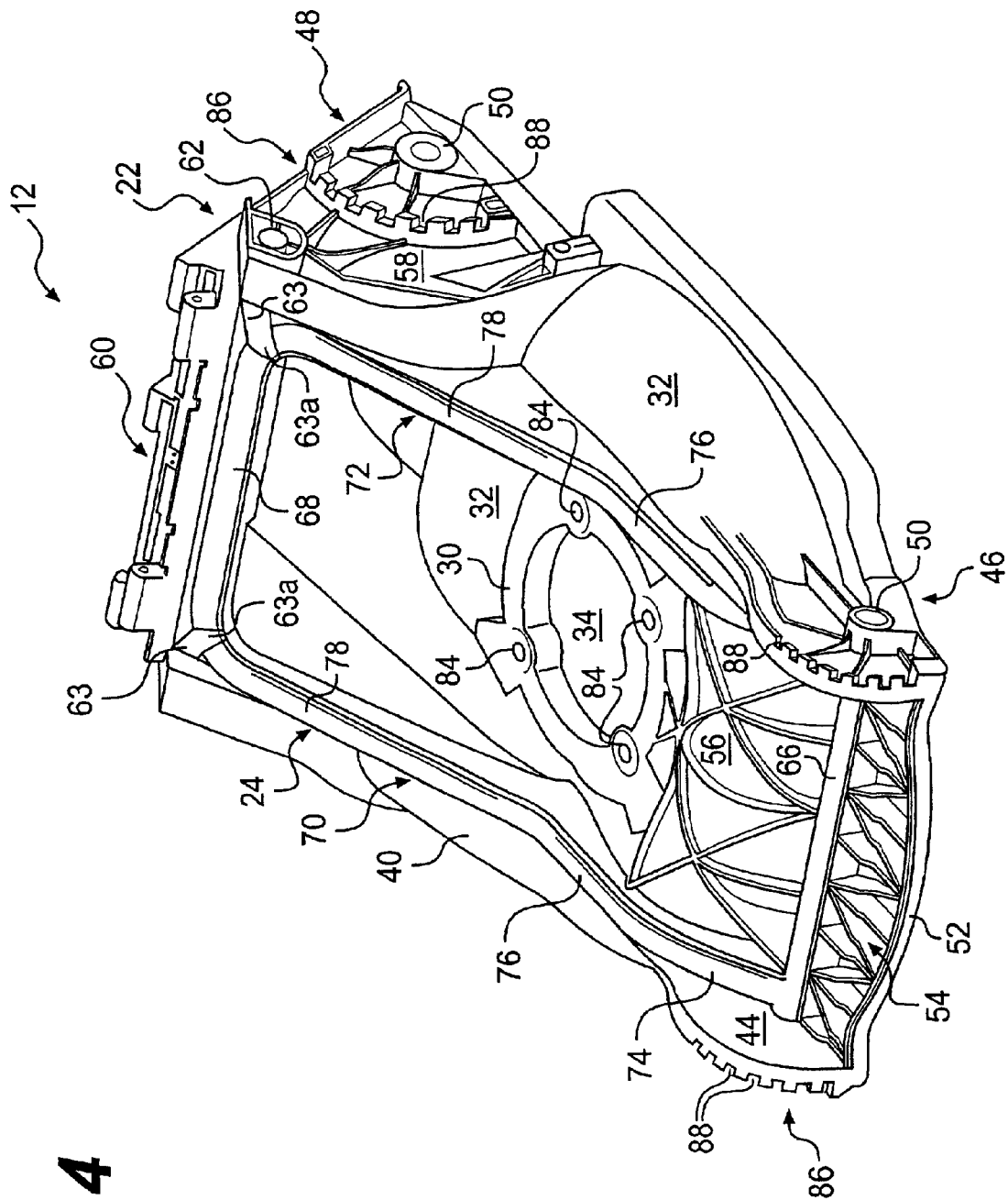
FIG. 4 is a perspective view of a partially assembled lawnmower deck shown in FIG. 2.
Figure 5:
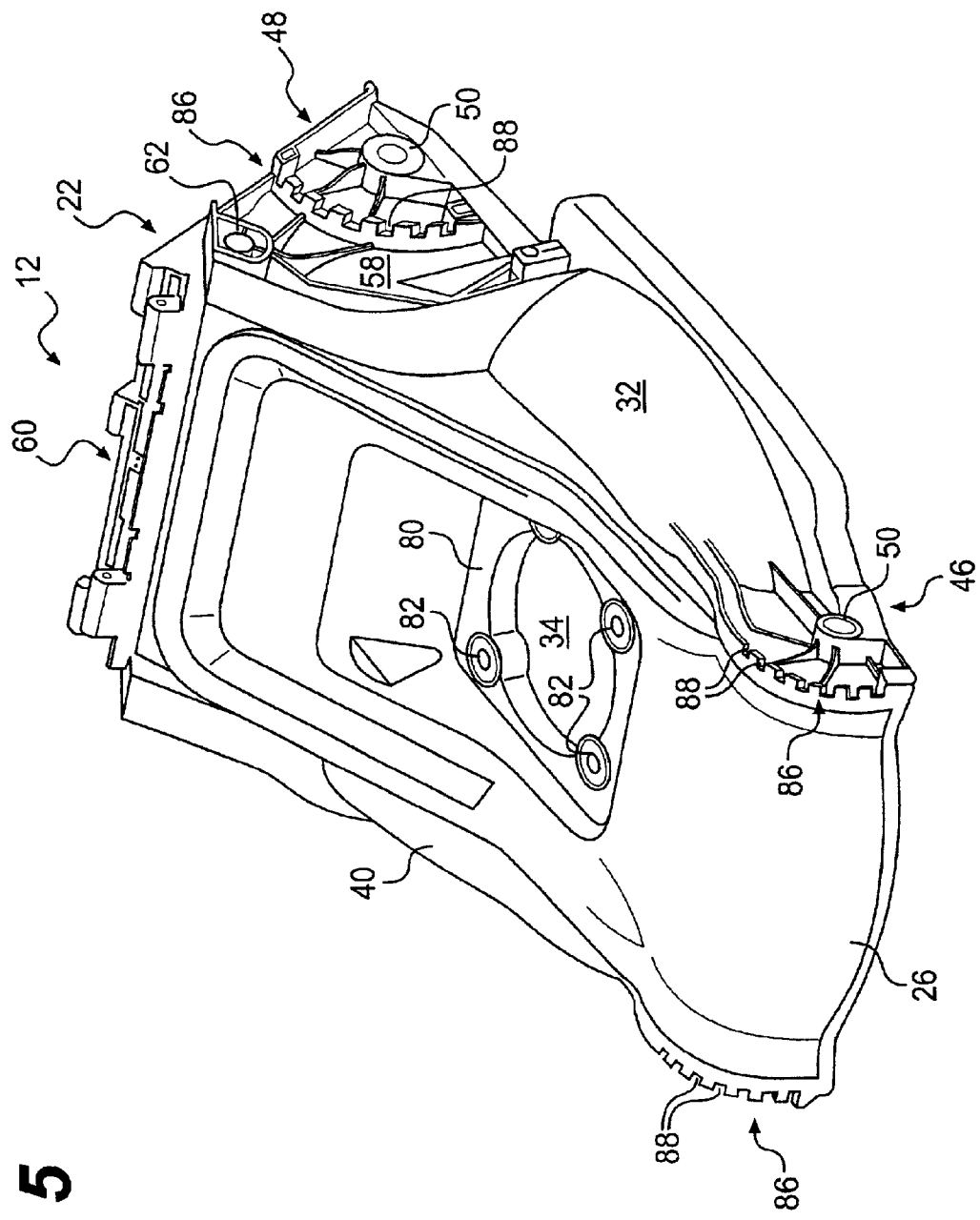
FIG. 5 is a perspective view of a fully assembled lawnmower deck shown in FIG. 2.

The cover 26 extends over the stiffener 24 and other reinforced areas of the main deck component 22 to be discussed below. A comparison of FIGS. 4 and 5 shows that the cover 26 conceals these structural enhancements from view when the deck 12 is fully assembled and in use. The cover 26 can also enhance the torsional and bending flexion resistances of the main deck component 22 and can be molded from plastic.

Figure 3:
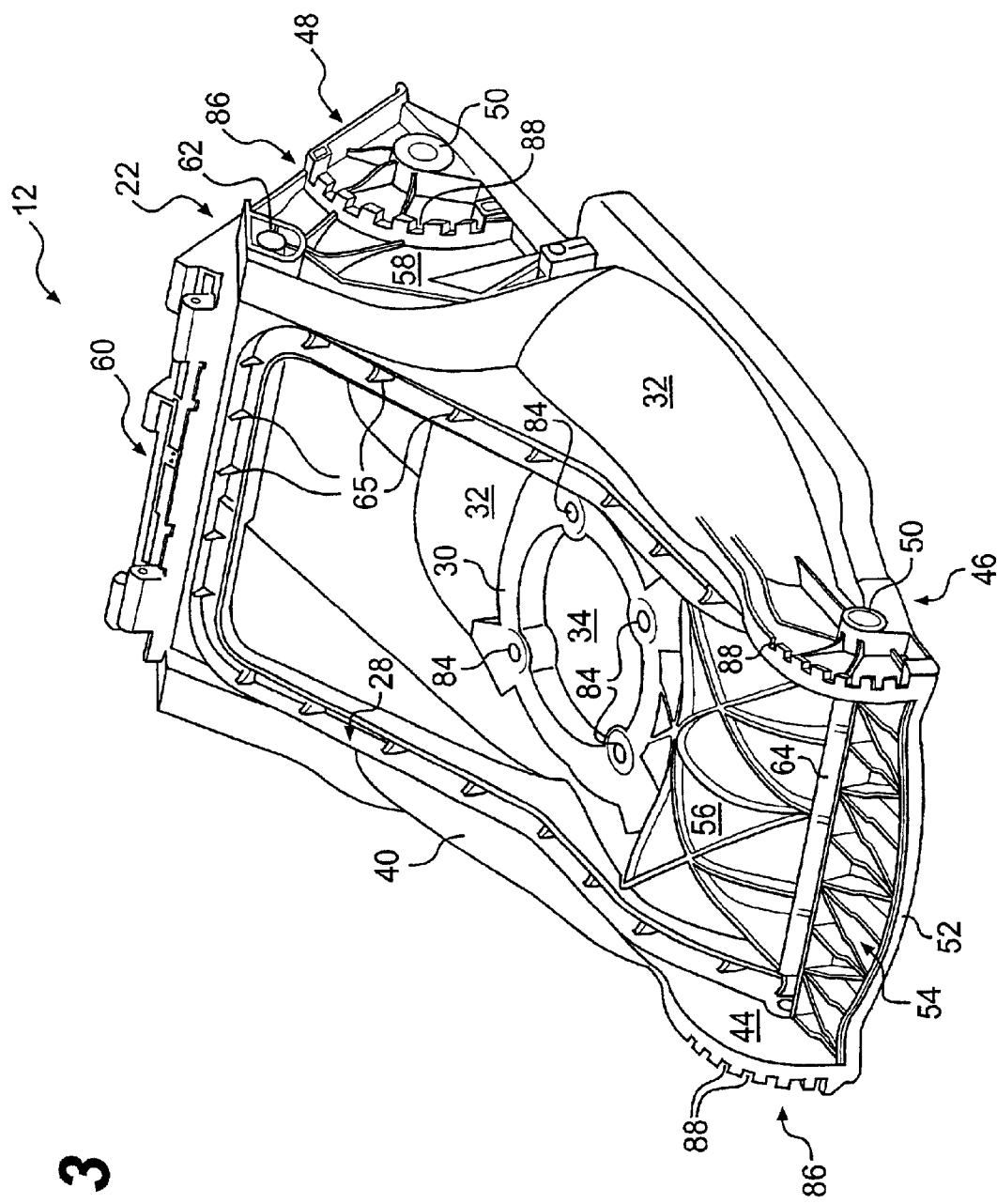
FIG. 3 is a perspective view of a main deck component shown in FIG. 2.

FIG. 3 shows the details of the main deck component 22. The main deck component 22 includes a top surface having an engine bed 30 and a skirt 32 extending out from the engine bed 30. An opening 34 is formed in the engine bed 30 through which the engine output shaft 36 (see FIG. 6) extends. The underneath of the skirt 32 defines a cutting chamber 38 (see FIG. 6) in which the blade 18 (see FIG. 6) rotates. The cutting chamber 38 is centered about the opening 34 and is preferably toroidal in shape. However, other shapes of the cutting chamber 38 are possible, especially if the cutting chamber 38 houses more than one blade 18.

The engine bed 30 can be replaced with one or more pulley mounts for decks designed to suspend (or float) from the frame of a garden tractor, riding mower or commercial walk-behind mower because the engine is mounted on the garden tractor, riding mower or commercial walk behind mower, not on the deck. In these deck designs, pulleys or other torque transmission system transmits torque from the engine to the blade(s) mounted in the cutting chamber of the deck.

The main deck component 22 further includes a discharge chute 40 in communication with the cutting chamber 38. The discharge chute 40 angles up from the cutting chamber 38 toward the rear of the main deck component 22 where it has an opening (not illustrated) to which a collection bag 42 (see FIG. 1) is attachable. The discharge chute 40 can be omitted from decks intended for exclusive use as a mulching deck because it is a non-essential component to a mulching deck.

The main deck component 22 also includes a wheel mount 44, 46, 48 at each corner (right rear wheel mount not shown). Each wheel mount 44, 46, 48 includes a pivot bearing 50 to pivotally support a height adjustment lever (not shown) and a wheel (not shown). The wheel mounts 44, 46, 48 can be formed as separate components and fastened to the main deck component 22 in a known conventional manner or, preferably, the wheel mounts 44, 46, 48 can be integrally formed with the main deck component 22.

The front wheel mounts 44, 46 extend forwardly of the front portion of the skirt 32. A horizontal span 52 extends forwardly of the front portion of the skirt 32 and connects to each of the front wheel mounts 44, 46. A first rib zone 54 extends across the horizontal span 52. A second rib zone 56 extends across the top of the skirt at the front portion of the skirt 32. The rib zones enhance the rigidity of the front portion of the main deck component 22. The rib zones 54, 56 are integrally formed with the main deck component 22.

The deck 12 has a bending axis parallel to a line connecting the front wheel mounts 44, 46 and centered between the front wheel mounts 44, 46 and the rear wheel mounts 48. The deck 12 has a torsional axis perpendicular to the bending axis and centered between the wheel mounts 46, 48 on the left side of the deck 12 and the wheel mount 44 and the right wheel mount (not shown) on the right side of the deck 12. The bending stiffness values discussed above are measured by deflecting the front wheel mounts 44, 46 relative to the rear wheel mounts 48 about the bending axis. The torsional stiffness values discussed above are measured by deflecting one of the front wheel mounts 44, 46 on one side of the main deck component 22 relative to one of the rear wheel mounts 48 on the opposite side of the main deck component 22 about the torsional axis. The bending flexion and torsional flexion of the main deck component 22 is resisted by at least the cover 26, the stiffener 24 and the rib zones 54, 56.

The main deck component 22 has a vertical sidewall 58 extending rearwardly from the rear portion of the skirt 32 on the opposite side of the discharge chute 40. The vertical sidewall 58 extends rearwardly and upwardly from a rear portion of the skirt to the same extent as the discharge chute 40. A rear span 60 extends between and connects to the top of the vertical sidewall and the top of the discharge chute 40.

The vertical sidewall 58 includes the left rear wheel mount 48, and an outboard wall (not shown) of the discharge chute 40 includes the right rear wheel mount (not shown) in mirror image to the left rear wheel mount 48. The vertical sidewall 58 and the outboard wall (not shown) also each include an integrally formed handle mount 62 to which the handle 20 connects (see FIG. 1). The handle mounts 62 are located above and forward of the rear wheel mounts 48 near the tops of the vertical wall 58 and the outboard wall (not shown).

Handle mount plates 63 connect the handle mounts 62 to the stiffener 24. The handle mount plates 63 each include a connecting portion 63a that extends across the corner of the stiffener 24 between the rear stiffener section 68 and the respective side stiffener 70, 72. Preferably, the connecting portion 63a can be welded to the stiffener 24. Alternatively, mechanical fasteners, such as pins, rivets, screws and bolts, can be used to secure the handle mount plates 63 to the stiffener 24.

Although the preferred embodiment employs four wheel mounts—one at each corner of the main deck component—any number and any location of the wheel mounts along the main deck component is possible to properly support the deck above the ground. For example, a floating deck such as that used with a garden tractor, riding mower or commercial walk-behind mower may locate the wheel mounts inboard of the corners of the deck. The floating decks may have two or more wheel mounts depending on their width and the type of mounting with the mower chassis.

The endless channel 28 extends endlessly around the main deck component 22 between each of the wheel mounts 44, 46, 48 and encircles the engine bed 30. A plurality of ribs span the endless channel 28 at locations spaced along channel 28. The plurality of ribs 65 connect the walls of the channel to each other and support the stiffener in the endless channel. A front portion 64 of the endless channel 28 joins the first rib zone 54 and second rib zone 56.

As shown in FIG. 4, the endless channel 28 receives the stiffener 24. Referring to FIGS. 2 and 4, the stiffener 24 is formed as an endless loop and includes a front stiffener section 66, a rear stiffener section 68 and two side stiffener sections 70, 72. Preferably in this first embodiment, the ends of front stiffener section 66 and the ends of the rear stiffener section 68 are joined to the respective ends of the side stiffener sections 70, 72 so that the front stiffener section 66 and the rear stiffener section 68 extend transversely between the side stiffener sections 70, 72. However, the side stiffener sections 70, 72 can be joined to the front and rear stiffener sections 66, 68 intermediate the ends of the front and rear stiffener sections 66, 68 such that the ends of the front stiffener section 66 and the ends of the rear stiffener section 68 extend beyond the side stiffener sections 70, 72.

The front stiffener section 66 is coaxial with the pivot bearings 50 of the front wheel mounts 44, 46. The rear stiffener section 68 extends parallel to the axis connecting the pivot bearings 50 of the rear wheel mounts 48. The side stiffener sections 70, 72 extend parallel to the line connecting the pivot bearings 50 of the respective front wheel mount 44 or 46 and the respective rear wheel mount 48. A nut (not illustrated) can be welded at each end of the front stiffener section 66. The wheel axle (not illustrated) of each front wheel can be secured to the respective nut. This arrangement provides a rigid link between the four corners of the main deck component 22 to enhance torsional flexion and bending flexion of the deck 12.

Alternatively, the stiffener 24 can be configured as an "X" brace instead of as an endless loop. In this alternate embodiment, each side stiffener section 70, 72 would extend from a respective end of the front stiffener section 66 to the diagonally opposite end of the rear stiffener section 68. This "X" brace could extend within the skirt 32 and configured to cross the opening 34 with sufficient clearance for the engine output shaft 36.

Returning to the preferred embodiment, the transition from the side stiffener sections 70, 72 to the front stiffener section 66 and rear stiffener section 68 can be curved or abrupt. In the preferred embodiment, the transition with the front stiffener section 66 is abrupt and the transition with the rear stiffener section 68 is curved.

The rear stiffener section 68 extends across the rear span 60 between the rear wheel mounts 48. The rear stiffener section 68 is spaced forwardly of the pivot bearings 50 of the rear wheel mounts 48 and is aligned with the handle mounts 62. The handle mount plates 63 are connected to the stiffener 24 adjacent to rear end of the side stiffener sections 70, 72 by a weld. This arrangement contributes to a maximum distribution of the input forces from the handle 20 to the stiffener 24, which in turn minimizes bending and torsional stresses in the main deck component 22.

Each side stiffener section 70, 72 includes a first inclined portion 74, a substantially horizontal portion 76 and a second inclined portion 78. The first inclined portion 74 extends from the front stiffener section 66 up along the front portion of the skirt 32 to where it joins with the substantially horizontal portion 76 at the top of the skirt 32. The second inclined portion 78 extends from the substantially horizontal portion 76 to the rear stiffener section 68.

In the preferred embodiment, the rear stiffener section 68 and the side stiffener sections 70, 72 are formed from a hollow steel rod that is bent into a U-shape. The front stiffener 66 section is formed from a separate hollow steel rod that is secured to the ends of the "U" by welding. The hollow steel rod can have a round cross-section or a rectangular cross-section. Other metals, such as aluminum and cast iron can be used to form the stiffener 24. Instead of welds, mechanical fasteners could be used to connect the "U" and the front stiffener section. Alternatively, each section of the stiffener can be formed separately and then assembled with welds or mechanical fasteners. Another alternative is to form the stiffener as a single piece requiring no welding or mechanical fasteners.

As shown in FIGS. 2 and 5, the cover 26 connects to the main deck component 22 and conceals the stiffener 24, the first rib zone 54 and the second rib zone 56. The cover 26 includes an engine mounting flange 80 that aligns with the engine bed 30 of the main deck component 22. The engine mounting flange 80 includes a plurality of mounting holes 82 that align with a plurality of mounting holes 84 in the engine bed. When mounting the prime mover 16 to the deck 12, the prime mover 20 is placed on top of the cover 26 and aligned with the mounting holes 82, 84. Bolts (not illustrated) pass through the prime mover 16 and the mounting holes 82, 84 in each of the engine mounting flange 80 and the engine bed 30 to secure the prime mover 16 to the deck 12.

In this embodiment, the stiffener 24 is sandwiched between the main deck component 22 and the cover 26. Thus, the fasteners used to secure the cover 26 to the main deck component 22 also secure the stiffener 24 to the main deck component 22. However, the stiffener 24 can be secured to the main deck component 22 in other ways such as mechanical fasteners connected between the main deck component and the stiffener or by overmolding the stiffener with the main deck component. Whatever the connection between the cover 26 and the main deck component 22, the cover 26 can enhance the flexion resistance of main deck component 22.

In the preferred embodiment, each wheel mount 44, 46, 48 includes a height adjustment 86 so that the deck 12 may be selectively raised or lower relative to the ground to provide different cutting heights. Each height adjustment 86 includes a plurality of arcuately spaced notches 88 radially spaced from the pivot bearing 50. Each notch 88 represents a different cutting height. The notches 88 can be integrally formed with the main deck component 22 or separately attached to the main deck component 22.

Each wheel axle (not shown) has a lever (not shown) extending away from the wheel axle (not shown) and pivotally mounted in the respective pivot bearing 50. The lever (not shown) includes a portion that is engageable with any one of the associated notches 88. This assembly is conventionally known in the art and omitted from the drawings so that the structure of the deck 12 may be illustrated without obstruction.

Figure 6:
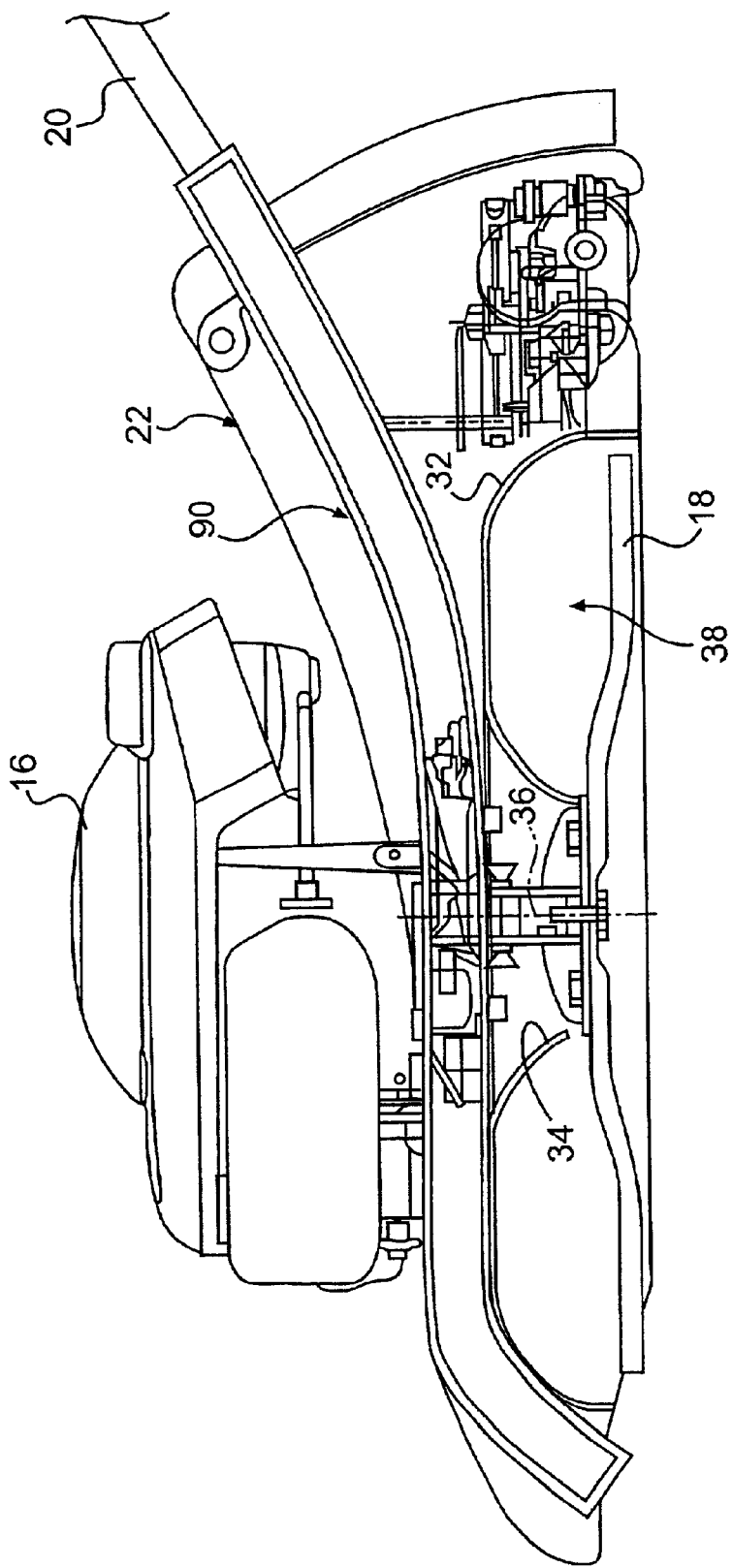
FIG. 6 is a cross-sectional view of a lawnmower deck according to a second embodiment of the invention.
Figure 7:
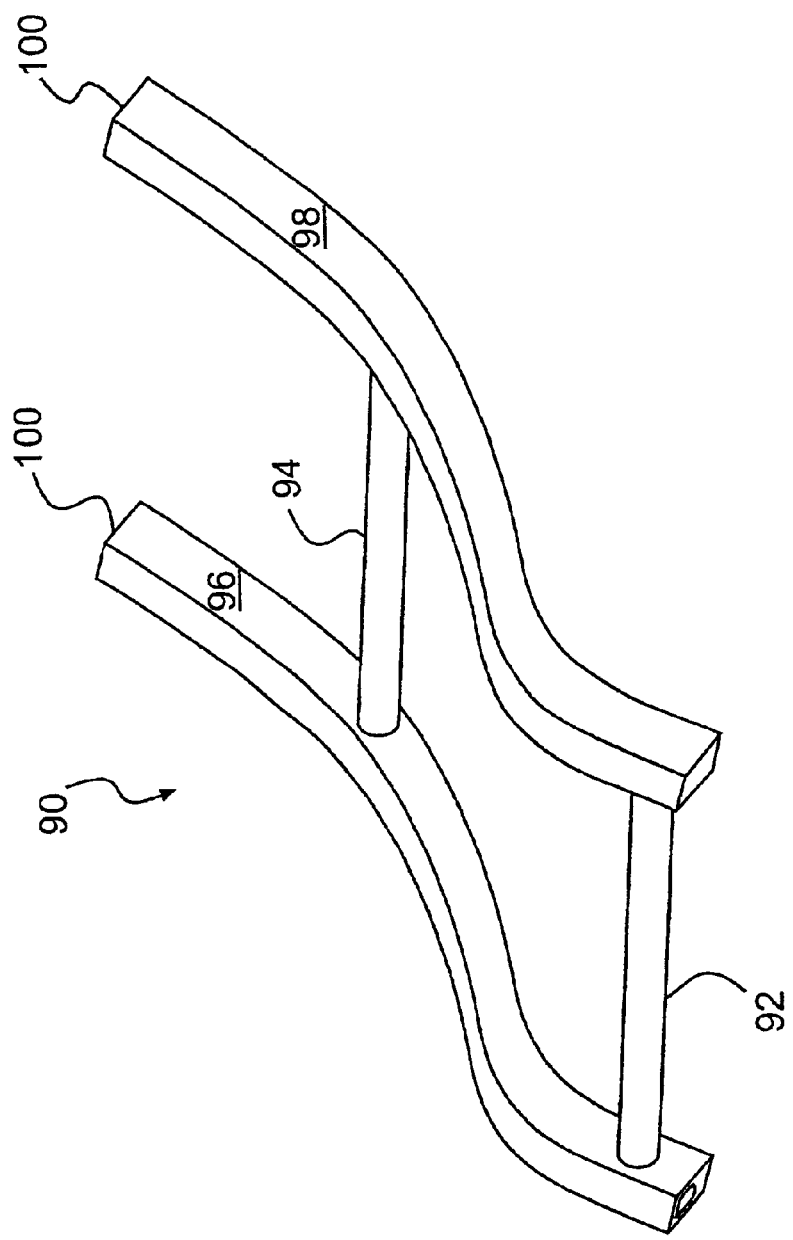
FIG. 7 is a perspective view of the stiffener shown in FIG. 6.

FIGS. 6 and 7 illustrate an alternate embodiment of the stiffener 24. The remainder of the lawnmower structure in this alternate embodiment is substantially identical to that of the preferred embodiment illustrated in FIGS. 1–5 so that like reference numbers refer to like structure. Only the differences will be discussed below.

As shown in FIG. 7, the stiffener 90 has a front stiffener section 92 and intermediate stiffener section 94 connected to two side stiffener sections 96, 98. As compared to the stiffener 24 of the preferred embodiment of FIGS. 1–5, the stiffener 90 of the second embodiment replaces the rear stiffener section 68 with the intermediate stiffener section 94, which is located intermediate of front stiffener section 92 and the rear ends 100 of the side stiffener sections 96, 98.

FIGS. 6 and 7 show that the shape of the side stiffener sections is substantially identical to the side stiffeners of the preferred embodiment of FIGS. 1–5. However, the rear ends 100 are provided with a handle mount (not shown) which telescopically receives the handle 20 (see FIG. 6). This embodiment provides a direct coupling between the handle 20 and the stiffener 90 as compared to the stiffener 24 of the first embodiment which requires the handle mounting plates 63 and the handle mounts 62. Further, this arrangement reduces the stress concentrations in the main deck component 22 caused by the input forces from the handle 20 because the input forces are carried directly by the stiffener 90 and distributed over its length before being transmitted to the main deck component 22.

To ensure a proper fit of the handle 20 telescopically received within the handle mounts (not shown), the cross-sectional shape of the portion of the handle 20 received in the handle mounts should be complimentary to that of the handle mounts. In the preferred embodiment, the cross-sectional shape for each is circular to minimize cost. Alternatively, other cross-sectional shapes, such as a square, rectangular and polygonal, can be used.

These stiffener sections 92, 94, 96, 98 are formed as separate pieces of steel and assembled by welds or mechanical fasteners. Alternatively, the stiffener 90 can be formed as a single piece. The stiffener sections 92, 94, 96, 98 can be formed hollow and can have a round cross-section or a rectangular cross-section. The stiffener 90 can be made from metals such as steel, cast iron and aluminum.

The present invention has been illustrated in a preferred embodiment as a walk-behind bagging mower. However, the present invention can be equally applied to a mulching mower or a floating deck such as those used with garden tractors, riding mowers and commercial walk-behind mowers.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

I claim:

1. A lawnmower deck comprising:
   a deck sub-assembly having a first stiffness and including:
      a top surface;
      a skirt extending outwardly and downwardly from the top surface and encircling the top surface, the skirt defining:
         a cutting chamber underneath the top surface; and
         a plurality of wheel mounts; and
   a stiffener connected to at least one of the top surface and the skirt so that the stiffener and the deck sub-assembly together have a combined stiffness that is at least approximately 20% greater than the first stiffness,
   wherein the deck sub-assembly further comprises an endless loop channel on the top surface, the endless loop channel receiving the stiffener.

2. The lawnmower deck according to claim 1, wherein the stiffener includes:
   two side stiffener sections; and
   two transverse stiffener sections being connected to the side stiffener sections.

3. The lawnmower deck according to claim 2, further including a cover extending over the stiffener and connected to the deck sub-assembly.

4. A lawnmower deck comprising:
   a deck sub-assembly having a first stiffness and including:
      a top surface;
      a skirt extending outwardly and downwardly from the top surface and encircling the top surface, the skirt defining:
         a cutting chamber underneath the top surface; and
         a plurality of wheel mounts;
   a stiffener connected to at least one of the top surface and the skirt so that the stiffener and the deck sub-assembly together have a combined stiffness that is at least approximately 20% greater than the first stiffness, the stiffener including an endless loop on the top surface, two side stiffener sections, and two transverse stiffener sections being connected to the side stiffener sections; and
   a cover extending over the stiffener and connected to the deck sub-assembly.

5. The lawnmower deck according to claim 4, wherein the plurality of wheel mounts include at least a first pair of wheel mounts; and
   the first stiffness and the combined stiffness are measured between the first pair of wheel mounts.

6. The lawnmower deck according to claim 5, wherein the first stiffness is one of a bending stiffness and a torsional stiffness and the combined stiffness is a corresponding one of a bending stiffness and a torsional stiffness.

7. The lawnmower deck according to claim 6, wherein the first stiffness and the combined stiffness are each a bending stiffness;
   the plurality of wheel mounts further include a third wheel mount;
   the deck further includes a torsional stiffness measured between the third wheel mount and one wheel mount of the first pair of wheel mounts so that the stiffener and the deck together have a second combined stiffness measured between the third wheel mount and the one wheel mount, the second combined stiffness is at least 20% greater than the second stiffness.

8. The lawnmower deck according to claim 7, wherein the plurality of wheel mounts further includes a fourth wheel mount; and
   the lawnmower deck further including a pair of handle mounts located above the third and fourth wheel mounts.

9. The lawnmower deck according to claim 8, wherein the stiffener extends between each of the wheel mounts.

10. The lawnmower deck according to claim 9, wherein the stiffener comprises a metallic hollow tube;
    the deck comprises plastic; and
    the stiffener is overmolded with the deck.

11. The lawnmower deck according to claim 10, wherein the combined stiffness is at least 30% greater than the first stiffness.

12. A walk-behind lawnmower comprising:
    a deck having a longitudinal axis and including:
       an engine bed;
       a skirt centered on the engine bed and extending outwardly and downwardly from the engine bed and encircling the engine bed, the skirt defining:
          a cutting chamber below the engine bed;
          a discharge chute in communication with the cutting chamber;
       two laterally spaced front wheel mounts at the front of the deck;
       two laterally spaced rear wheel mounts at the rear of the deck; and
       a channel extending between each of the wheel mounts and including:
          a first channel portion extending longitudinally along the deck; and
          a second channel portion extending transversely along the deck;
    a stiffener received in the channel;
    a cover extending over the stiffener;
    a prime mover mounted on the engine bed; and
    a handle connected to the deck.

13. The walk-behind lawnmower according to claim 12, wherein the stiffener encircles the engine bed.

14. The walk-behind lawnmower according to claim 13, wherein the stiffener comprises:
    two side stiffener sections; and
    two transverse stiffener sections connected to the side stiffener sections.

15. The walk-behind lawnmower according to claim 14, wherein
    the one of the transverse stiffener sections extends between the front wheel mounts;
    the other of the transverse stiffener sections extends between the rear wheel mounts;
    each of the side stiffener sections extends between a respective one of the front wheel mounts and a respective one of the rear wheel mount.

16. A walk-behind lawnmower comprising:
a deck having:
an engine bed;
a skirt centered on the engine bed and extending outwardly and downwardly from the engine bed and encircling the engine bed, the skirt defining:
a cutting chamber below the engine bed;
a discharge chute in communication with the cutting chamber;
two laterally spaced front wheel mounts at the front of the deck;
two laterally spaced rear wheel mounts at the rear of the deck; and
a channel extending between each of the wheel mounts and along the discharge chute;
a stiffener received in the channel;
a cover extending over the stiffener;
a prime mover mounted on the engine bed; and
a handle connected to the deck;
wherein the stiffener encircles the engine bed and includes:
two side stiffener sections; and
two transverse stiffener sections connected to the side stiffener sections;
wherein the one of the transverse stiffener sections extends between the front wheel mounts; the other of the transverse stiffener sections extends between the rear wheel mounts; and each of the hide stiffener sections extends between a respective one of the front wheel mounts and a respective one of the rear wheel mount;
wherein each of the side stiffener sections includes:
two inclined sections; and
a substantially horizontal section intermediate the inclined sections;
the cover engages the substantially horizontal sections, one of the inclined sections and the other transverse stiffener section; and
the cover is spaced from the other of the inclined sections and the one transverse stiffener section.

17. The walk-behind lawnmower according to claim 16, wherein the skirt further defines a vertical wall spaced from the discharge chute and extending upwardly relative to the engine bed;
the one inclined section on one of the side stiffener sections extends along the vertical wall; and
the one of the inclined sections of the other of the side stiffener sections extends along the discharge chute.

18. The walk-behind lawnmower according to claim 17, wherein the one transverse stiffener section is connected to one end of each of the side stiffener sections; and
the other transverse stiffener section is connected to the other end of each of the side stiffener sections and extends from the vertical wall to the discharge chute.

19. The walk-behind lawnmower according to claim 18, wherein the one transverse stiffener section is connected to one end of each of the side stiffener sections; and
the other transverse stiffener section is connected to the side stiffener sections intermediate the one transverse stiffener section and the other end of each of the side stiffener sections.

20. The walk-behind lawnmower according to claim 19, wherein each of the wheel mounts comprises a pivot bearing adapted to pivotally support a height adjustment lever; and
the one transverse stiffener section is aligned with the pivot bearings of the front wheel mounts.

21. The walk-behind lawnmower according to claim 20, further comprises a pair of handle mounts, each handle mount is located above a respective one of the rear wheel mounts and is connected to the stiffener; and
the handle is connected to the handle mounts.

22. The walk-behind lawnmower according to claim 21, wherein the handle mounts are connected to the stiffener proximate the junction of the side stiffener sections and the other transverse stiffener section.

23. The walk-behind lawnmower according to claim 21, wherein the handle mounts are formed in the other ends of the side stiffener sections.

24. The walk-behind lawnmower according to claim 21, wherein the deck comprises plastic and the stiffener comprises metal.

25. The walk-behind lawnmower according to claim 21, wherein the skirt further defines ribs extending between the front wheel mounts on either side of the one transverse stiffener; and
the cover extends over the ribs.

26. The walk-behind lawnmower according to claim 12, wherein the channel further comprising:
a third channel portion extending longitudinally along the deck; and
a fourth channel portion extending transversely along the deck.

27. The walk-behind lawnmower according to claim 26, wherein the first, second, third and fourth channel portions defining an endless loop channel.

\* \* \* \* \*